US008901260B2

(12) United States Patent
Bafna et al.

(10) Patent No.: US 8,901,260 B2
(45) Date of Patent: *Dec. 2, 2014

(54) HETEROGENEOUS ETHYLENE ALPHA-OLEFIN INTERPOLYMERS

(75) Inventors: Ayush A. Bafna, Manvel, TX (US); Mehmet Demirors, Pearland, TX (US); Sylvie Desjardins, Lake Jackson, TX (US); Douglas S. Ginger, Houston, TX (US); Colleen M. Tice, Houston, TX (US); Terry A. Pearce, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/750,311

(22) Filed: Mar. 30, 2010

(65) Prior Publication Data
US 2010/0324202 A1 Dec. 23, 2010

Related U.S. Application Data

(60) Provisional application No. 61/165,065, filed on Mar. 31, 2009.

(51) Int. Cl.
C08F 210/16 (2006.01)
C08L 23/08 (2006.01)
C08F 4/60 (2006.01)
C08L 23/06 (2006.01)
B32B 7/02 (2006.01)
B32B 27/32 (2006.01)

(52) U.S. Cl.
CPC . C08L 23/06 (2013.01); B32B 7/02 (2013.01); B32B 27/32 (2013.01); C08F 210/16 (2013.01); C08L 23/0815 (2013.01)
USPC .................. 526/124.1; 526/124.2; 526/124.3; 526/348; 526/348.1; 526/348.2; 525/240

(58) Field of Classification Search
USPC ............. 526/348, 348.1, 348.2, 124.1, 124.2, 526/124.3; 525/240
See application file for complete search history.

(56) References Cited

U.S. PATENT DOCUMENTS

| 3,284,421 | A | 11/1966 | Breslow et al. |
|---|---|---|---|
| 3,297,674 | A | 1/1967 | Breslow et al. |
| 3,485,706 | A | 12/1969 | Evans |
| 4,076,698 | A | 2/1978 | Anderson et al. |
| 4,198,315 | A | 4/1980 | Birkelbach et al. |
| 4,322,027 | A | 3/1982 | Reba |
| 4,340,563 | A | 7/1982 | Appel et al. |
| 4,413,110 | A | 11/1983 | Kavesh et al. |
| 4,544,762 | A | 10/1985 | Kaminsky et al. |
| 4,599,392 | A | 7/1986 | McKinney et al. |
| 4,663,220 | A | 5/1987 | Wisneski et al. |
| 4,668,566 | A | 5/1987 | Braun |
| 4,798,081 | A | 1/1989 | Hazlitt et al. |
| 4,950,541 | A | 8/1990 | Tabor et al. |
| 4,957,790 | A * | 9/1990 | Warren ........................ 428/34.9 |
| 5,008,204 | A | 4/1991 | Stehling |
| 5,015,749 | A | 5/1991 | Schmidt et al. |
| 5,041,584 | A | 8/1991 | Crapo et al. |
| 5,041,585 | A | 8/1991 | Deavenport et al. |
| 5,266,627 | A | 11/1993 | Meverden et al. |
| 5,292,845 | A | 3/1994 | Kawasaki et al. |
| 5,487,938 | A | 1/1996 | Spencer et al. |
| 5,542,199 | A | 8/1996 | Dreisbach et al. |
| 5,844,045 | A | 12/1998 | Kolthammer et al. |
| 5,844,055 | A * | 12/1998 | Brandt et al. ............... 526/127 |
| 5,869,575 | A | 2/1999 | Kolthammer et al. |
| 5,977,251 | A | 11/1999 | Kao et al. |
| 6,448,341 | B1 | 9/2002 | Kolthammer et al. |
| 6,469,103 | B1 * | 10/2002 | Jain et al. ..................... 525/240 |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 6,797,779 | B1 | 9/2004 | Ajbani et al. |
| 2006/0276594 | A1 * | 12/2006 | German et al. ............... 525/240 |
| 2006/0286321 | A1 * | 12/2006 | Broadus et al. ............. 428/35.7 |
| 2008/0038533 | A1 | 2/2008 | Best et al. |
| 2008/0287634 | A1 | 11/2008 | Nieto et al. |

FOREIGN PATENT DOCUMENTS

| EP | 0891381 | 12/2001 |
|---|---|---|
| WO | WO-01/60907 | 8/2001 |
| WO | WO-2005/021622 A2 | 3/2005 |
| WO | WO-2007/061587 A1 | 5/2007 |
| WO | WO 2007/061587 A1 * | 5/2007 |

OTHER PUBLICATIONS

Balke, Mourey, et al. Chromatography Poly., Ch 12 (1992), 181-199.
Balke, Thitiratsakul, Lew, Cheung, Mourey, *Chromatography Polym.*, Chapter 13, (1992), 119-219.
J. C. Randall et al., in "NMR and Macromolecules" ACS Symposium series 247, 1984, ix-x.7.
Wild, et al., Journal of Polymer Science, Poly. Phys. Ed., vol. 20, 441 (1982).
J.C. Randall, Rev. Macromol. Chem. Phys., C29, 201-317, 1989.
J.C. Randall, Rev. Macromol. Chem. Phys., C29, vol. 2&3, 285-297, 1989.
Zimm, G.H. and Stockmayer, W.H., J. Chem. Phys., 17, 1301 (1949).
Rudin, A., Modern Methods of Polymer Characterization, John Wiley and Sons, New York (1991) 103-112.

(Continued)

*Primary Examiner* — Roberto Rabago

(57) ABSTRACT

An interpolymer of ethylene and at least one alpha-olefin is claimed, wherein the ethylene interpolymer is characterized as having an average $M_v$ and a valley temperature between the interpolymer and high crystalline fraction, $T_{hc}$, such that the average $M_v$ for a fraction above $T_{hc}$ from ATREF divided by average $M_v$ of the whole polymer from ATREF ($M_{hc}/M_p$) is less then about 1.95 and wherein the interpolymer has a CDBI of less than 60%. The interpolymer of ethylene and at least one alpha-olefin can also be characterized as having a high density (HD) fraction and an overall density such that % HD fraction<$-2733.3+2988.7x+144111.5$ $(x-0.92325)^2$ where x is the density in grams/cubic centimeter. Fabricated articles comprising the novel interpolymers are also disclosed.

16 Claims, 1 Drawing Sheet

(56) References Cited

OTHER PUBLICATIONS

Balke, Mourey, et al. Chromatography Poly., Ch 12 (1992), 180-199.
Balke, Thitiratsakul, Lew, Cheung, Mourey, *Chromatography Polym.*, Chapter 13, (1992).
Zimm, B.H., *J. Chem. Phys.*, 16, 1099 (1948).
Kratochvil, P., Classical Light Scattering from Polymer Solutions, Elsevier, Oxford, NY (1987), 113-144.
J. C. Randall et al., in "NMR and Macromolecules" ACS Symposium series 247, 1984.
PCT/US10/29214 International Search Report & Written Opinion, Apr. 2011.
PCT/US10/29214 International Preliminary Report on Patentability, Oct. 2011.
Japanese Office Action dated Oct. 25, 2013; from Japanese counterpart Application No. 2012-503616.
Response to Japanese Office Action dated Feb. 6, 2014; from Japanese counterpart Application No. 2012-503616.

\* cited by examiner

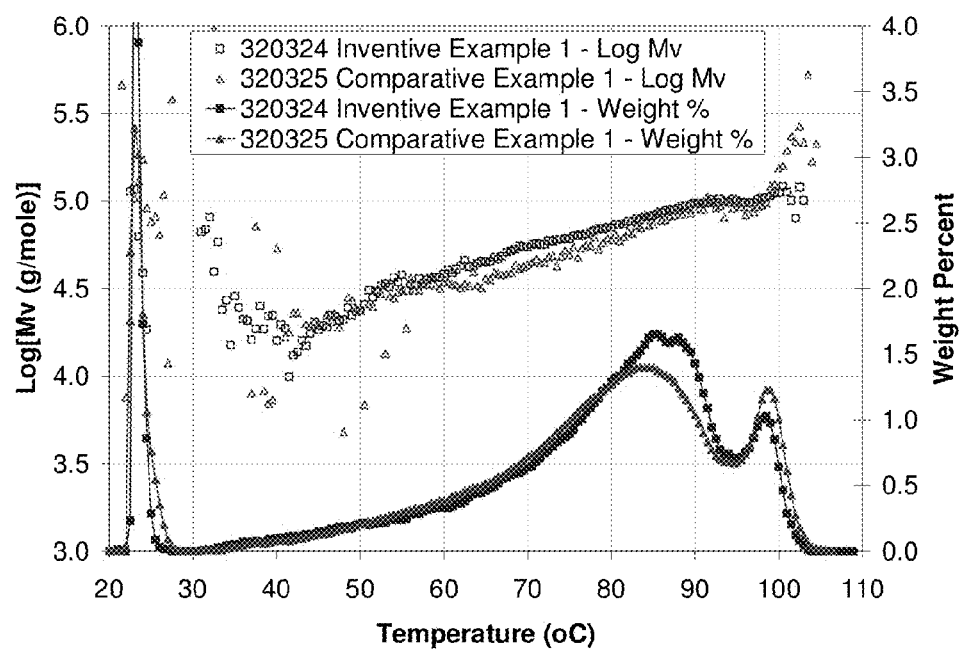

HETEROGENEOUS ETHYLENE ALPHA-OLEFIN INTERPOLYMERS

CROSS-REFERENCE TO RELATED APPLICATIONS

This application is a non-provisional application claiming priority from the U.S. Provisional Patent Application No. 61/165,065, filed on Mar. 31, 2009, entitled "HETEROGENEOUS ETHYLENE ALPHA-OLEFIN COPOLYMER WITH REDUCED HIGH CRYSTALLINE FRACTION AND NARROW MOLECULAR WEIGHT DISTRIBUTION.

BACKGROUND OF THE INVENTION

Ethylene alpha-olefin copolymer resins that can make films with improved aesthetics (optical) and abuse resistance (dart) properties create value to end-users. Heterogeneous ethylene alpha-olefin copolymers have both high crystalline (thick crystals) and copolymer (thin crystals) fractions.

Optical properties of a film can be defined in terms of surface gloss, haze and clarity. Haze can depend on internal haze (bulk scattering) and external haze (surface scattering). Both external haze and internal haze can be a function of the high crystalline fraction content and high crystalline fraction molecular weight of the resin used to make the film. High crystalline fraction can be made of thick crystals that scatter light and hence an increase in the high crystalline fraction content increases the haze of the film and hurts its optical properties. Decreasing the molecular weight of the high crystalline fraction can increase the thickness of the crystals in the high crystalline fraction. The thicker the high crystalline fraction crystals, the worse are the film optics. Hence a reduced content and increased molecular weight of the high crystalline fraction would be desirable for improved optics, although too high of a molecular weight can cause melt fracture problems due to high melt elasticity. Also, increasing the molecular weight of the high crystalline fraction, for improved optics, could hurt dart properties of the film. Higher molecular weight of the copolymer fraction is desirable for higher film dart. For a particular resin melt index (MI or $I_2$), increasing the molecular weight of the high crystalline fraction for improved optics, has to be balanced by lowering the molecular weight of copolymer fraction so that the MI be kept constant. This decrease in copolymer molecular weight will hurt the dart properties. Therefore an optimum high crystalline fraction molecular weight is desirable for balanced dart and optical properties. Thick crystals from the high crystalline fraction provide strength to the film improving its tear properties. Decreasing the high crystalline fraction content for improving optics could therefore hurt film tear. In order to achieve a balance of tear and optical properties an optimum content of high crystalline fraction is desirable.

Surface haze of the film can depend on the molecular weight distribution of the ethylene alpha-olefin copolymer. Very broad molecular weight distribution usually increases melt elasticity of the resin leading to surface melt fracture while very narrow molecular weight distribution can cause processing issues at the die causing surface melt fracture. Since presence of surface melt fracture hurts film optical properties, an optimum molecular weight distribution is also required for improved optical properties.

Dart properties of films can depend on the molecular weight distribution and on the copolymer fraction content. The narrower the molecular weight distribution and more the copolymer fraction content, the higher is the film dart. Too narrow of molecular weight distribution could hurt optical properties and processability (film fabrication) and hence an optimum molecular weight distribution is required for a balance of processability, dart and optical properties. Also, increase in copolymer fraction content could be achieved at a cost of reduction in high crystalline fraction content and this could hurt film tear. Therefore in order to achieve a good balance of processability, dart, tear and optical properties, a particular combination of molecular weight distribution and high crystalline and copolymer fraction content is required.

The present invention is a resin family, and a process to make them, with this particular combination of molecular weight distribution and high crystalline and copolymer fraction content and molecular weight. For an equivalent density and melt index, this combination of resin characteristics produces a film with balanced optics, dart, tear and processability.

BRIEF SUMMARY OF THE INVENTION

In one embodiment, an interpolymer of ethylene and at least one alpha-olefin is made, characterized wherein the interpolymer has an average $M_v$ and a valley temperature between the interpolymer and high crystalline fraction, $T_{hc}$, such that the average $M_v$ for a fraction above $T_{hc}$ from ATREF divided by average $M_v$ of the whole polymer from ATREF ($M_{hc}/M_p$) is less then about 1.95, preferably less than 1.7, and wherein the interpolymer has a CDBI of less than 60%, preferably less than 55%.

In a second embodiment, an interpolymer of ethylene and at least one alpha-olefin is made, wherein the interpolymer is characterized as having a high density (HD) fraction and an overall density such that % HD fraction$<-2733.3+2988.7x+144111.5(x-0.92325)^2$ where x is the density in grams/cubic centimeter.

In either embodiment, the interpolymer is preferably heterogeneously branched. Film can be made from the interpolymers of either embodiment, especially films comprising Dart A of at least 550 grams, or comprising haze of <10%, or comprising 45 degree gloss units of >75 units, or comprising Normalized MD Tear>400 grams/mil. The film can comprise at least one layer comprising the interpolymer of either the first or second embodiment.

In either embodiment, the interpolymer can further comprise at least one other natural or synthetic polymer, preferably low density polyethylene. The interpolymer of either embodiment can comprise a melt index from about 0.1 to about 10 g/10 min, or can comprise an overall density from about 0.9 to about 0.935 g/cm$^3$, or can comprise long chain branches of less than 1 per 1000 C atoms, or can comprise a molecular weight distribution, $M_w/M_n$, of less than about 5.

A fabricated article can comprise the interpolymer of either the first or second embodiment. Further the interpolymer of either the first or second embodiment can be at least partially cross-linked to at least 5%, by weight, gel.

A third embodiment is a process to make an interpolymer of ethylene and at least one alpha-olefin comprising the steps of contacting ethylene with at least one alpha-olefin under polymerizations of temperature and pressure with a catalyst composition to form an ethylene/alpha-olefin interpolymer having an average $M_v$ and a valley temperature between the interpolymer and high crystalline fraction, $T_{hc}$, such that the average $M_v$ for a fraction above $T_{hc}$ from ATREF divided by average $M_v$ of the whole polymer from ATREF ($M_{hc}/M_p$) is less then about 1.95 and has a CDBI of less than 60%, wherein the polymerization conditions comprise a molar ratio of aluminum to catalyst metal atom of from about 1:1 to about 5:1, and recovering the ethylene/alpha-olefin interpolymer, preferably wherein said catalyst composition comprises the product which results from combining:

(A) a magnesium halide prepared by contacting:
(1) at least one hydrocarbon soluble magnesium component represented by the general formula R"R'Mg.xAlR'3 wherein each R" and R' are alkyl groups
(2) at least one non-metallic or metallic halide source under conditions such that the reaction temperature does not exceed about 60° C., preferably does not exceed about 40° C., and most preferably does not exceed about 35° C.;

(B) at least one transition metal compound represented by the formula $Tm(OR)y\, Xy-x$ wherein Tm is a metal of Groups IVB, VB, VIB, VIIB or VIII of the Periodic Table; R is a hydrocarbyl group having from 1 to about 20, preferably from 1 to about 10 carbon atoms, and (C) an additional halide source if an insufficient quantity of component (A-2) is present to provide the desired excess X:Mg ratio.

BRIEF DESCRIPTION OF THE DRAWINGS

The foregoing summary as well as the following detailed description will be better understood when read in conjunction with the appended drawings. It should be understood, however, that the invention is not limited to the precise arrangements and instrumentalities shown. The components in the drawings are not necessarily to scale, with emphasis instead being placed upon clearly illustrating the principles of the present invention. Moreover, in the drawings, like reference numerals designate corresponding parts throughout the several views.

FIG. 1 plots Short Chain Branching Distribution and log My data from ATREF for Inventive Example 1 and Comparative Example 1.

DETAILED DESCRIPTION OF THE INVENTION

The following discussion is presented to enable a person skilled in the art to make and use the disclosed compositions and methods. The general principles described may be applied to embodiments and applications other than those detailed without departing from the spirit and scope of the disclosed compositions and methods. The disclosed compositions and methods are not intended to be limited to the embodiments shown, but is to be accorded the widest scope consistent with the principles and features disclosed.

Balance of processability, dart, tear and optical properties was achieved by making a unique combination of resin molecular weight distribution and high crystalline and copolymer fraction content. Resin characteristics and film property details are listed in Table 1, FIG. 1 and Table 2. High density fraction content was significantly dropped and that of the copolymer fraction was increased. Ratio of viscosity average molecular weight of the high crystalline fraction to that of the whole polymer was lowered, indicating lower molecular weight of the high crystalline fraction. Ratio of viscosity average molecular weight of the copolymer fraction to that of the whole polymer was increased indicating higher molecular weight of the copolymer fraction. These differences in the resin characteristics were achieved by reducing the reactor temperature from about 160° C. to about 180° C., especially 175° C. and reducing the Al/Ti molar ratio from about 1:1 to about 5:1, especially 1:1 to about 2.5:1.

Film made from the inventive resin, having unique combination of molecular characteristics, had significantly improved dart and optics without any sacrifice in MD Tear and processability.

This resin can be used for applications where improvement in optical and dart properties are required without sacrificing film tear properties and processability during film fabrication.

Low reactor temperature is useful for narrowing the molecular weight distribution. Reactor temperature of 175° C. yielded a product with narrow molecular weight distribution without significantly reducing the production output (lb/hr). Significant further reduction in temperature could further narrow the molecular weight distribution but significantly lower the output and also make the product hurt the processability (film fabrication) of the resin.

Low Al/Ti ratio is useful for narrowing the molecular weight distribution and also for reducing the high crystalline fraction and increasing the copolymer fraction. For a HEC-3 catalyst with 3.0 Ti/40 Mg ratio, an Al/Ti ratio of 1.5 yielded a product with narrow molecular weight distribution, less high crystalline fraction and more copolymer fraction without significantly affecting reactor stability.

Preferably the reactor temperature is from about 160° C. to about 180° C.

Preferably the ratio of aluminum to metal atom, preferably Al/Ti, is from about 1:1 to about 5:1.

The melt index of the disclosed ethylenic polymer can be from about 0.01 to about 1000 g/10 minutes, as measured by ASTM 1238-04 (2.16 kg and 190° C.).

Ethylene-Based Polymers

Suitable ethylene-based polymers can be prepared with Ziegler-Natta catalysts. Examples of linear ethylene-based polymers include high density polyethylene (HDPE) and linear low density polyethylene (LLDPE). Suitable polyolefins include, but are not limited to, ethylene/diene interpolymers, ethylene/α-olefin interpolymers, ethylene homopolymers, and blends thereof.

Suitable heterogeneous linear ethylene-based polymers include linear low density polyethylene (LLDPE), ultra low density polyethylene (ULDPE), and very low density polyethylene (VLDPE). For example, some interpolymers produced using a Ziegler-Natta catalyst have a density of about 0.89 to about 0.94 g/cm$^3$ and have a melt index ($I_2$) from about 0.01 to about 1,000 g/10 minutes, as measured by ASTM 1238-04 (2.16 kg and 190° C.). Preferably, the melt index ($I_2$) can be from about 0.1 to about 50 g/10 minutes. Heterogeneous linear ethylene-based polymers may have a molecular weight distributions, $M_w/M_n$, from about 3.5 to about 5.

The linear ethylene-based polymer may comprise units derived from one or more α-olefin copolymers as long as there is at least 50 mole percent polymerized ethylene monomer in the polymer.

High density polyethylene (HDPE) may have a density in the range of about 0.94 to about 0.97 g/cm$^3$. HDPE is typically a homopolymer of ethylene or an interpolymer of ethylene and low levels of one or more α-olefin copolymers. HDPE contains relatively few branch chains relative to the various copolymers of ethylene and one or more α-olefin copolymers. HDPE can be comprised of less than 5 mole % of the units derived from one or more α-olefin comonomers Linear ethylene-based polymers such as linear low density polyethylene and ultra low density polyethylene (ULDPE) are characterized by an absence of long chain branching, in contrast to conventional low crystallinity, highly branched ethylene-based polymers such as LDPE. Heterogeneous linear ethylene-based polymers such as LLDPE can be prepared via solution, slurry, or gas phase polymerization of ethylene and one or more α-olefin comonomers in the presence of a Ziegler-Natta catalyst, by processes such as are disclosed in U.S. Pat. No. 4,076,698 (Anderson, et al.). Relevant discussions of both of these classes of materials, and their methods of preparation are found in U.S. Pat. No. 4,950,541 (Tabor, et al.). Other patents and publications to make LLDPE include WO 2008/0287634, U.S. Pat. No. 4,198,315, U.S. Pat. No. 5,487,938, EP 0891381, and U.S. Pat. No. 5,977,251.

An α-olefin comonomer may have, for example, from 3 to 20 carbon atoms. Preferably, the α-olefin comonomer may have 3 to 8 carbon atoms. Exemplary α-olefin comonomers include, but are not limited to, propylene, 1-butene, 3-methyl-1-butene, 1-pentene, 3-methyl-1-pentene, 4-methyl-1-pentene, 1-hexene, 1-heptene, 4,4-dimethyl-1-pentene, 3-ethyl-1-pentene, 1-octene, 1-nonene, 1-decene, 1-dodecene, 1-tetradecene, 1-hexadecene, 1-octadecene and 1-eicosene. Commercial examples of linear ethylene-based polymers that are interpolymers include ATTANE™ Ultra Low Density Linear Polyethylene Copolymer, DOWLEX™ Polyethylene Resins, and FLEXOMER™ Very Low Density Polyethylene, all available from The Dow Chemical Company.

In a further aspect, when used in reference to an ethylene homopolymer (that is, a high density ethylene homopolymer not containing any comonomer and thus no short chain branches), the terms "homogeneous ethylene polymer" or "homogeneous linear ethylene polymer" may be used to describe such a polymer.

The ethylene-based polymers described herein are relatively inhomogeneous (or heterogeneous) ethylene polymers that possess short chain branches and that are characterized by a relatively low composition distribution breadth index (CDBI). That is, the ethylene polymer has a CDBI less than or equal to about 55 percent, preferably less than or equal to about 50 percent, more preferably less than or equal to about 45 percent, but usually include a measurable high density (crystalline) polymer fraction.

The CDBI is defined as the weight percent of the polymer molecules having a co-monomer content within 50 percent of the median total molar co-monomer content and represents a comparison of the co-monomer distribution in the polymer to the co-monomer distribution expected for a Bernoulhan distribution. The CDBI of polyolefins can be conveniently calculated from data obtained from techniques known in the art, such as, for example, temperature rising elution fractionation ("TREF") as described, for example, by Wild, et al., *Journal of Polymer Science*, Poly. Phys., Ed., Vol, 20, 441 (1982); L. D. Cady, "The Role of Comonomer Type and Distribution in LLDPE Product Performance," *SPE Regional Technical Conference*, Quaker Square Hilton, Akron, Ohio, 107-119 (Oct. 1-2, 1985); or in U.S. Pat. No. 4,798,081 (Hazlitt, et al.) and U.S. Pat. No. 5,008,204 (Stehling). However, the TREF technique does not include purge quantities in CDBI calculations. More preferably, the co-monomer distribution of the polymer is determined using $^{13}C$ NMR analysis in accordance with techniques described, for example, in U.S. Pat. No. 5,292,845 (Kawasaki, et al.) and by J. C. Randall in Rev. Macromol. Chem. Phys., C29, 201-317.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, 285-297). There are other known techniques useful for determining the presence of long chain branches in ethylene polymers, including ethylene/I-octene interpolymers. Two such exemplary methods are gel permeation chromatography coupled with a low angle laser light scattering detector (GPC-LALLS) and gel permeation chromatography coupled with a differential viscometer detector (GPC-DV).

The use of these techniques for long chain branch detection and the underlying theories have been well documented in the literature. See, for example, Zimm, G. H. and Stockmayer, W. H., *J. Chem. Phys.*, 17, 1301 (1949), and Rudin A., *Modern Methods of Polymer Characterization*, John Wiley & Sons, New York (1991) 103-112.

The terms "heterogeneous" and "heterogeneously branched" mean that the ethylene polymer can be characterized as a mixture of interpolymer molecules having various ethylene to comonomer molar ratios. Heterogeneously branched linear ethylene polymers are available from The Dow Chemical Company as DOWLEX™ linear low density polyethylene and as ATTANE™ ultra-low density polyethylene resins, Heterogeneously branched linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 (Anderson, et al.). Heterogeneously branched ethylene polymers are typically characterized as having molecular weight distributions, Mw/Mn, from about 3 to about 5 and, as such, are distinct from substantially linear ethylene polymers and homogeneously branched linear ethylene polymers in regards to both compositional short chain branching distribution and molecular weight distribution.

Highly Long Chain Branched Ethylene-Based Polymers

Highly long chain branched ethylene-based polymers, such as low density polyethylene (LDPE), which can be blended with the novel heterogeneous ethylene polymers herein, can be made using a high-pressure process using free-radical chemistry to polymerize ethylene monomer. Typical LDPE polymer density is from about 0.91 to about 0.94 g/cm$^3$. The low density polyethylene may have a melt index ($I_2$) from about 0.01 to about 150 g/10 minutes. Highly long chain branched ethylene-based polymers such as LDPE may also be referred to as "high pressure ethylene polymers", meaning that the polymer is partly or entirely homopolymerized or copolymerized in autoclave or tubular reactors at pressures above 13,000 psig with the use of free-radical initiators, such as peroxides (see, for example, U.S. Pat. No. 4,599,392 (McKinney, et al.)). The process creates a polymer with significant branches, including long chain branches.

Highly long chain branched ethylene-based polymers are typically homopolymers of ethylene; however, the polymer may comprise units derived from one or more α-olefin copolymers as long as there is at least 50 mole percent polymerized ethylene monomer in the polymer.

Comonomers that may be used in forming highly branched ethylene-based polymer include, but are not limited to, α-olefin comonomers, typically having no more than 20 carbon atoms. For example, the α-olefin comonomers, for example, may have 3 to 10 carbon atoms; or in the alternative, the α-olefin comonomers, for example, may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α,β-unsaturated $C_3$-$C_8$-carboxylic acids, in particular maleic acid, fumaric acid, itaconic acid, acrylic acid, methacrylic acid and crotonic acid derivates of the α,β-unsaturated $C_3$-$C_8$-carboxylic acids, for example unsaturated $C_3$-$C_{15}$-carboxylic acid esters, in particular ester of $C_1$-$C_6$-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Process

For producing the ethylene-based polymer of the invention, a solution-phase polymerization process may be used. Typically such a process occurs in a well-stirred reactor such as a loop reactor or a sphere reactor at temperature from about 150 to about 300° C., preferably from about 160 to about 180° C., and at pressures from about 30 to about 1000 psi, preferably from about 30 to about 750 psi. The residence time in such a process is from about 2 to about 20 minutes, preferably from about 10 to about 20 minutes. Ethylene, solvent, catalyst, and optionally one or more comonomers are fed continuously to the reactor. Exemplary catalysts in these embodiments include, but are not limited to, Ziegler-Natta catalysts. Exemplary solvents include, but are not limited to, isoparaffins. For example, such solvents are commercially available under the name ISOPAR E (ExxonMobil Chemical Co., Houston, Tex.). The resultant mixture of ethylene-based polymer and solvent is then removed from the reactor and the polymer is isolated. Solvent is typically recovered via a solvent recovery unit, that is, heat exchangers and vapor liquid separator drum, and is recycled back into the polymerization system.

For producing the highly long chain branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from about 100 to about 3000 meters, preferably from about 1000 to about 2000 meters. The beginning of a reaction zone for either type of reactor is defined by the side injection of either initiator of the reaction, ethylene, telomer, comonomer(s) as well as any combination thereof. A high pressure process can be carried out in autoclave or tubular reactors or in a combination of autoclave and tubular reactors, each comprising one or more reaction zones.

The catalyst or initiator is injected prior to the reaction zone where free radical polymerization is to be induced. In other embodiment processes, the ethylene-based polymer may be fed into the reaction system at the front of the reactor system and not formed within the system itself. Termination of catalyst activity may be achieved by a combination of high reactor temperatures for the free radical polymerization portion of the reaction or by feeding initiator into the reactor dissolved in a mixture of a polar solvent such as isopropanol, water, or conventional initiator solvents such as branched or unbranched alkanes.

Embodiment processes may include a process recycle loop to improve conversion efficiency. In some embodiment processes, the recycle loop may be treated to neutralize residues or byproducts from the previous reaction cycle that may inhibit polymerization of either the ethylene-based polymer or the highly long chain branched ethylene-based polymer or inhibit the reaction forming the disclosed ethylenic polymer. In some embodiment processes, fresh monomer is added to this stream.

Ethylene used for the production of ethylene-based polymers or highly long chain branched ethylene-based polymer may be purified ethylene, which is obtained by removing polar components from a loop recycle stream or by using a reaction system configuration such that only fresh ethylene is used for making the ethylene-based polymers. It is not typical that purified ethylene is required to make highly long chain branched ethylene-based polymer. In such cases ethylene from the recycle loop may be used.

Chain transfer agents or telogens (CTA) are typically used to control the melt index in a free-radical polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. For high pressure free radical polymerizaton, these agents can be of many different types, such as saturated hydrocarbons, unsaturated hydrocarbons, aldehydes, ketones or alcohols. Typical CTAs that can be used include, but are not limited to, propylene, isobutane, n-butane, 1-butene, methyl ethyl ketone, propionaldehyde, ISOPAR (ExxonMobil Chemical Co.), and isopropanol. The amount of CTAs to use in the process is about 0.03 to about 10 weight percent of the total reaction mixture.

The melt index (MI or $I_2$) of a polymer, which is inversely related to the molecular weight, is controlled by manipulating the concentration of the chain transfer agent. For free radical polymerization, after the donation of a hydrogen atom, the CTA forms a radical which can react with the monomers, or with an already formed oligomers or polymers, to start a new polymer chain. This means that any functional groups present in the chain transfer agents will be introduced in the polymer chains. A large number of CTAs, for example, propylene and 1-butene which have an olefinically unsaturated bond, may also be incorporated in the polymer chain themselves, via a copolymerization reaction. Polymers produced in the presence of chain transfer agents are modified in a number of physical properties such as processability, optical properties such as haze and clarity, density, stiffness, yield point, film draw and tear strength.

Hydrogen has been shown to be a chain transfer agent for high pressure free radical polymerization and in the production of the high crytallinity ethylene-based polymer. Control of the molecular weight made in the reaction zones for disclosed processes may be accomplished by feeding hydrogen to the reaction zones where catalyst or initiator is injected. The final product melt index control would be accomplished by feeding chain transfer agents to the reaction zones where free radical polymerization takes place. Feed of the free radical chain transfer agents could be accomplished by direct injection into the reaction zones or by feeding them to the front of the reactor. In some embodiment processes, it may be necessary to remove excess CTA from the recycle stream or limit injection so as to prevent excess buildup of CTA in the front end of the process.

Free radical initiators that are generally used to produce ethylene-based polymers are oxygen, which is usable in tubular reactors in conventional amounts of between 0.0001 and 0.005 wt. % drawn to the weight of polymerizable monomer, and peroxides. Preferred initiators are t-butyl peroxy pivalate, di-t-butyl peroxide, t-butyl peroxy acetate and t-butyl peroxy-2-hexanoate or mixtures thereof. These organic peroxy initiators are used in conventional amounts of between 0.005 and 0.2 wt. % drawn to the weight of polymerizable monomers.

The peroxide initiator may be, for example, an organic peroxide. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals.

Exemplary cyclic peroxides include, but are not limited to, 3,6,9-triethyl-3,6,9-trimethyl-1,4,7-triperoxonane. Such cyclic peroxides, for example, are commercially available under the tradename TRIGONOX 301 (Akzo Nobel; Arnhem, The Netherlands). Exemplary diacyl peroxides include, but are not limited to, di(3,5,5-trimethylhexanoyl) peroxide. Such diacyl peroxides, for example, are commercially available under the tradename TRIGONOX 36 (Akzo Nobel). Exemplary dialkyl peroxides include, but are not limited to, 2,5-dimethyl-2,5-di(tert-butylperoxy)hexane; 2,5-dimethyl-2,5-di(tert-butylperoxy)hexyne-3; di-tert-amyl peroxide; di-tert-butyl peroxide; and tert-butyl cumyl peroxide. Such dialkyl peroxides, for example, are commercially available under the tradenames TRIGONOX 101, TRIGONOX 145, TRIGONOX 201, TRIGONOX B, and TRIGONOX T (Akzo Nobel). Exemplary hydroperoxides include, but are not limited to, tert-Amyl hydroperoxide; and 1,1,3,3-tetramethylbutyl hydroperoxide. Such hydroperoxides, for example, are commercially available under the tradenames TRIGONOX TAHP, and TRIGONOX TMBH (Akzo Nobel). Exemplary peroxycarbonates include, but are not limited to, tert-butylperoxy 2-ethylhexyl carbonate; tert-amylperoxy 2-ethylhexyl carbonate; and tert-butylperoxy isopropyl carbonate. Such peroxycarbonates, for example, are commercially available under the tradenames TRIGONOX 117, TRIGONOX 131, and TRIGONOX BPIC (Akzo Nobel). Exemplary peroxydicarbonates include, but are not limited to, di(2-ethylhexyl) peroxydicarbonates; and di-sec-butyl peroxydicarbonates. Such peroxydicarbonates, for example, are commercially available under the tradename TRIGONOX EHP, and TRIGONOX SBP (Akzo Nobel). Exemplary peroxyesters include, but are not limited to, tert-amyl peroxy-2-ethylhexanoate; tert-amyl peroxyneodecanoate; tert-amyl peroxypivalate; tert-amyl peroxybenzoate; tert-amyl peroxyacetate; 2,5-dimethyl-2,5-di(2-ethylhexanoylperoxy)hexane; tert-butyl peroxy-2-ethylhexanoate; tert-butyl peroxyneodecanoate; tert-butyl peroxyneoheptanoate; tert-butyl peroxypivalate; tert-butyl peroxydiethylacetate; tert-butyl peroxyisobutyrate; 1,1,3,3-tetramethylbutyl peroxy-2-ethylhexanoate; 1,1,3,3-tetramethylbutyl peroxyneodecanoate; 1,1,3,3-tetramethylbutyl peroxypivalate; tert-butyl peroxy-3,5,5-trimethylhexanoate; cumyl peroxyneodecanoate; tert-butyl peroxybenzoate; and tert-butyl peroxyacetate. Such peroxyesters solvents, for example, are commercially available under the tradenames TRIGONOX 121; TRIGONOX 123; TRIGONOX 125; TRIGONOX 127; TRIGONOX 133; TRIGONOX 141; TRIGONOX 21; TRIGONOX 23; TRIGONOX 257; TRIGONOX 25; TRIGONOX 27; TRIGONOX 41; TRIGONOX 421; TRIGONOX 423; TRIGONOX 425; TRIGONOX 42; TRIGONOX 99; TRIGONOX C; and TRIGONOX F (Akzo Nobel). Exemplary peroxyketals include, but are not limited to, 1,1-di(tert-amylperoxy)cyclohexane; 1,1-di(tert-butylperoxy)cyclohexane; 1,1-di(tert-butylperoxy)-3,3,5-trimethylcyclohexane; and 2,2-di(tert-butylperoxy)butane. Such peroxyketals, for example, are commercially available under the tradenames TRIGONOX 122, TRIGONOX 22, TRIGONOX 29, and TRIGONOX D (Akzo Nobel). The free radical initiator system may, for example, include a mixture or combination of any of the aforementioned peroxide initiators. The peroxide initiator may comprise less than 60 percent by weight the free radical initiator system.

The free radical initiator system further includes at least one hydrocarbon solvent. The hydrocarbon solvent may, for example, be a $C_5$ to $C_{30}$ hydrocarbon solvent. Exemplary hydrocarbon solvents include, but are not limited to, mineral solvents, normal paraffinic solvents, isoparaffinic solvents, cyclic solvents, and the like. The hydrocarbon solvents may, for example, be selected from the group consisting of n-octane, iso-octane (2,2,4-trimethylpentane), n-dodecane, iso-dodecane (2,2,4,6,6-pentamethylheptane), and other isoparaffinic solvents. Exemplary hydrocarbon solvents such as isoparaffinic solvents, for example, are commercially available under the tradenames ISOPAR C, ISOPAR E, and ISOPAR H (ExxonMobil Chemical Co.). The hydrocarbon solvent may comprise less than 99 percent by weight of the free radical initiator system.

Suitable catalysts for use in embodiment processes include any compound or combination of compounds that is adapted for preparing polymers of the desired composition or type, either the ethylene-based polymers or the highly long chain branched ethylene-based polymers. Heterogeneous catalysts may be employed. In some embodiment processes, heterogeneous catalysts, including the well known Ziegler-Natta compositions, especially Group 4 metal halides supported on Group 2 metal halides or mixed halides and alkoxides and the well known chromium or vanadium based catalysts, may be used. In some embodiment processes, the catalysts for use may be homogeneous catalysts comprising a relatively pure organometallic compound or metal complex, especially compounds or complexes based on metals selected from Groups 3-10 or the Lanthanide series. If more than one catalyst is used in a system, it is preferred that any catalyst employed not significantly detrimentally affect the performance of another catalyst under the conditions of polymerization. Desirably, no catalyst is reduced in activity by greater than 25 percent, more preferably greater than 10 percent under the conditions of the polymerization.

In embodiment processes employing a complex metal catalyst, such a catalyst may be activated to form an active catalyst composition by combination with a cocatalyst, preferably a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. So-called modified methyl aluminoxane (MMAO) or triethyl aluminum (TEA) is also suitable for use as a cocatalyst. One technique for preparing such modified aluminoxane is disclosed in U.S. Pat. No. 5,041,584 (Crapo, et al.). Aluminoxanes can also be made as disclosed in U.S. Pat. No. 5,542,199 (Lai, et al.); U.S. Pat. No. 4,544,762 (Kaminsky, et al.); U.S. Pat. No. 5,015,749 (Schmidt, et al.); and U.S. Pat. No. 5,041,585 (Deavenport, et al.).

In some embodiment processes, processing aids, such as plasticizers, can also be included in the embodiment ethylenic polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex.).

In some embodiment processes, embodiment ethylenic polymers are treated with one or more stabilizers, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The embodiment ethylenic polymer composition may, for example, comprise less than 10 percent by the combined weight of one or more additives, based on the weight of the embodiment ethylenic polymer.

The embodiment ethylenic polymer may further be compounded. In some embodiment ethylenic polymer compositions, one or more antioxidants may further be compounded into the polymer and the compounded polymer pelletized. The compounded ethylenic polymer may contain any amount of one or more antioxidants. For example, the compounded ethylenic polymer may comprise from about 200 to about 600 parts of one or more phenolic antioxidants per one million parts of the polymer. In addition, the compounded ethylenic polymer may comprise from about 800 to about 1200 parts of a phosphite-based antioxidant per one million parts of polymer. The compounded disclosed ethylenic polymer may further comprise from about 300 to about 1250 parts of calcium stearate per one million parts of polymer.

Cross-Linking Agents

Some suitable cross-linking agents have been disclosed in Zweifel Hans et al., "Plastics Additives Handbook," Hanser Gardner Publications, Cincinnati, Ohio, 5th edition, Chapter 14, pages 725-812 (2001); Encyclopedia of Chemical Technology, Vol. 17, 2nd edition, Interscience Publishers (1968); and Daniel Seern, "Organic Peroxides," Vol. 1, Wiley-Interscience, (1970), all of which are incorporated herein by reference.

Non-limiting examples of suitable cross-linking agents include peroxides, phenols, azides, aldehyde-amine reaction products, substituted ureas, substituted guanidines; substituted xanthates; substituted dithiocarbamates; sulfur-containing compounds, such as thiazoles, sulfenamides, thiuramidisulfides, paraquinonedioxime, dibenzoparaquinonedioxime, sulfur; imidazoles; silanes and combinations thereof.

Non-limiting examples of suitable organic peroxide cross-linking agents include alkyl peroxides, aryl peroxides, peroxyesters, peroxycarbonates, diacylperoxides, peroxyketals, cyclic peroxides and combinations thereof. In some embodiments, the organic peroxide is dicumyl peroxide, t-butylisopropylidene peroxybenzene, 1,1-di-t-butyl peroxy-3,3,5-trimethylcyclohexane, 2,5-dimethyl-2,5-di(t-butyl peroxy) hexane, t-butyl-cumyl peroxide, di-t-butyl peroxide, 2,5-dimethyl-2,5-di-(t-butyl peroxy) hexyne or a combination thereof. In one embodiment, the organic peroxide is dicumyl peroxide. Additional teachings regarding organic peroxide cross-linking agents are disclosed in C. P. Park, "*Polyolefin Foam*", Chapter 9 of *Handbook of Polymer Foams and Technology*, edited by D. Klempner and K. C. Frisch, Hanser Publishers, pp. 198-204, Munich (1991), which is incorporated herein by reference.

Non-limiting examples of suitable azide cross-linking agents include azidoformates, such as tetramethylenebis (azidoformate); aromatic polyazides, such as 4,4'-diphenylmethane diazide; and sulfonazides, such as p,p'-oxybis(benzene sulfonyl azide). The disclosure of azide cross-linking agents can be found in U.S. Pat. Nos. 3,284,421 and 3,297,674, both of which are incorporated herein by reference.

The poly(sulfonyl azide) is any compound having at least two sulfonyl azide groups (i.e., —$SO_2N_3$) that are reactive towards the ethylene/α-olefin interpolymer disclosed herein. In some embodiments, the poly(sulfonyl azide)s have a structure of X—R—X wherein each X is —$SO_2N_3$ and R represents an unsubstituted or inertly substituted hydrocarbyl, hydrocarbyl ether or silicon-containing group. In some embodiments, the R group has sufficient carbon, oxygen or silicon, preferably carbon, atoms to separate the sulfonyl azide groups sufficiently to permit a facile reaction between the ethylene/α-olefin interpolymer and the sulfonyl azide groups. In other embodiments, the R group has at least 1, at least 2, or at least 3 carbon, oxygen or silicon, preferably carbon, atoms between the sulfonyl azide groups. The term "inertly substituted" refers to substitution with atoms or groups which do not undesirably interfere with the desired reaction(s) or desired properties of the resulting cross-linked polymers. Such groups include fluorine, aliphatic or aromatic ethers, siloxanes and the like. Non-limiting examples of suitable structures of R include aryl, alkyl, alkaryl, arylalkyl, silanyl, heterocyclyl, and other inert groups. In some embodiments, the R group includes at least one aryl group between the sulfonyl groups. In other embodiments, the R group includes at least two aryl groups (such as when R is 4,4' diphenylether or 4,4'-biphenyl). When R is one aryl group, it is preferred that the group have more than one ring, as in the case of naphthylene bis(sulfonyl azides). In some embodiments, the poly(sulfonyl)azides include 1,5-pentane bis(sulfonylazide), 1,8-octane bis(sulfonyl azide), 1,10-decane bis (sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and combinations thereof. In other embodiments, the poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and combinations thereof.

Non-limiting examples of suitable aldehyde-amine reaction products include formaldehyde-ammonia, formaldehyde-ethylchloride-ammonia, acetaldehyde-ammonia, formaldehyde-aniline, butyraldehyde-aniline, heptaldehyde-aniline, and combinations thereof.

Non-limiting examples of suitable substituted ureas include trimethylthiourea, diethylthiourea, dibutylthiourea, tripentylthiourea, 1,3-bis(2-benzothiazolylmercaptomethyl) urea, N,N-diphenylthiourea, and combinations thereof.

Non-limiting examples of suitable substituted guanidines include diphenylguanidine, di-o-tolylguanidine, diphenylguanidine phthalate, the di-o-tolylguanidine salt of dicatechol borate, and combinations thereof.

Non-limiting examples of suitable substituted xanthates include zinc ethylxanthate, sodium isopropylxanthate, butylxanthic disulfide, potassium isopropylxanthate, zinc butylxanthate, and combinations thereof.

Non-limiting examples of suitable dithiocarbamates include copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, zinc isopropyloctyl-dithiocarbamate, and combinations thereof.

Non-limiting examples of suitable thiazoles include 2-mercaptobenzothiazole, zinc mercaptothiazolyl mercaptide, 2-benzothiazolyl-N,N-diethylthiocarbamyl sulfide, 2,2'-dithiobis(benzothiazole), and combinations thereof.

Non-limiting examples of suitable imidazoles include 2-mercaptoimidazoline 2-mercapto-4,4,6-trimethyldihydropyrimidine, and combinations thereof.

Non-limiting examples of suitable sulfenamides include N-t-butyl-2-benzothiazole-, N-cyclohexylbenzothiazole-, N,N-diisopropylbenzothiazole-, N-(2,6-dimethylmorpholino)-2-benzothiazole-, N,N-diethylbenzothiazole-sulfenamide, and combinations thereof.

Non-limiting examples of suitable thiuramidisulfides include N,N'-diethyl-, tetrabutyl-, N,N'-diisopropyldioctyl-, tetramethyl-, N,N'-dicyclohexyl-, N,N'-tetralaurylthiuramidisulfide, and combinations thereof.

In some embodiments, the cross-linking agents are silanes. Any silane that can effectively graft to and/or cross-link the ethylene/α-olefin interpolymer or the polymer blend disclosed herein can be used. Non-limiting examples of suitable silane cross-linking agents include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group such as a hydrocarbyloxy, hydrocarbonyloxy, and hydrocarbylamino group. Non-limiting examples of suitable hydrolyzable groups include methoxy, ethoxy, formyloxy, acetoxy, proprionyloxy, alkyl and arylamino groups. In other embodiments, the silanes are the unsaturated alkoxy silanes which can be grafted onto the interpolymer. Some of these silanes and their preparation methods are more fully described in U.S. Pat. No. 5,266,627, which is incorporated herein by reference. In further embodiments, the silane cross-linking agents are vinyltrimethoxysilane, vinyltriethoxysilane, vinyltris(2-methoxyethoxy)silane, vinyltriacetoxysilane, vinylmethyldimethoxysilane, 3-methacryloyloxypropyltrimethoxysilane, and combinations thereof.

The amount of the silane cross-linking agent can vary widely, depending upon the nature of the ethylene/α-olefin interpolymer or the polymer blend, the silane employed, the processing conditions, the amount of grafting initiator, the ultimate application, and other factors. When vinyltrimethoxysilane (VTMOS) is used, the amount of VTMOS is generally at least about 0.1 weight percent, at least about 0.5 weight percent, or at least about 1 weight percent, based on the combined weight of the silane cross-linking agent and the interpolymer or the polymer blend.

Uses

The embodiment ethylenic polymer may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the embodiment ethylenic polymer include blends with other natural or synthetic materials, polymers, additives, reinforcing agents, ignition resistant additives, antioxidants, stabilizers, colorants, extenders, crosslinkers, blowing agents, and plasticizers.

The embodiment ethylenic polymer may be used in producing fibers for other applications. Fibers that may be prepared from the embodiment ethylenic polymer or blends thereof include staple fibers, tow, multicomponent, sheath/core, twisted, and monofilament. Suitable fiber forming processes include spunbonded and melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The embodiment ethylenic polymer may be used in a variety of films, including but not limited to clarity shrink films, collation shrink films, cast stretch films, silage films, stretch hooder films, sealants, stand up pouch films, liner films, and diaper backsheets.

The embodiment ethylenic polymer is also useful in other direct end-use applications. The embodiment ethylenic polymer is useful for wire and cable coating operations, in sheet extrusion for vacuum forming operations, and forming molded articles, including the use of injection molding, blow molding process, or rotomolding processes. Compositions comprising the embodiment ethylenic polymer can also be formed into fabricated articles using conventional polyolefin processing techniques.

Other suitable applications for the embodiment ethylenic polymer include films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

Further treatment of the embodiment ethylenic polymer may be performed to apply the embodiment ethylenic polymer for other end uses. For example, dispersions (both aqueous and non-aqueous) can also be formed using the present polymers or formulations comprising the same. Frothed foams comprising the embodiment ethylenic polymer can also be formed, as disclosed in PCT Publication No. 2005/021622 (Strandburg, et al.). The embodiment ethylenic polymer may also be crosslinked by any known means, such as the use of peroxide, electron beam, silane, azide, or other cross-linking technique. The embodiment ethylenic polymer can also be chemically modified, such as by grafting (for example by use of maleic anhydride (MAH), silanes, or other grafting agent), halogenation, amination, sulfonation, or other chemical modification.

Additives and adjuvants may be added to the embodiment ethylenic polymer post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the embodiment ethylenic polymer with other polyolefins may be performed. Suitable polymers for blending with the embodiment ethylenic polymer include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.);

U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company) and VISTAMAXX™ (ExxonMobil Chemical Co.)) can also be useful as components in blends comprising the embodiment ethylenic polymer.

Blends and mixtures of the embodiment ethylenic polymer may include thermoplastic polyolefin blends (TPO), thermoplastic elastomer blends (TPE), thermoplastic vulcanizates (TPV) and styrenic polymer blends. TPE and TPV blends may be prepared by combining embodiment ethylenic polymers, including functionalized or unsaturated derivatives thereof, with an optional rubber, including conventional block copolymers, especially an SBS block copolymer, and optionally a crosslinking or vulcanizing agent. TPO blends are generally prepared by blending the embodiment polymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779 (Ajbani, et al.).

DEFINITIONS

The term "composition," as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "linear" refers to polymers where the polymer backbone of the polymer lacks measurable or demonstrable long chain branches, for example, the polymer is substituted with an average of less than 0.01 long branch per 1000 carbons.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined. The terms "ethylene/α-olefin polymer" is indicative of interpolymers as described.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

The term "ethylenic polymer" refers to a polymer resulting from the bonding of an ethylene-based polymer and at least one highly long chain branched ethylene-based polymer.

Test Methods

Density

Density ($g/cm^3$) is measured according to ASTM-D 792-03, Method B, in isopropanol. Specimens are measured within 1 hour of molding after conditioning in the isopropanol bath at 23° C. for 8 min to achieve thermal equilibrium prior to measurement. The specimens are compression molded according to ASTM D-4703-00 Annex A with a 5 min initial heating period at about 190° C. and a 15° C./min cooling rate per Procedure C. The specimen is cooled to 45° C. in the press with continued cooling until "cool to the touch."

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

DSC Crystallinity

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using:

$$\% \text{ Crystallinity} = ((H_f)/(292 \text{ J/g})) \times 100.$$

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure.

With 3D-GPC absolute weight average molecular weight ("$M_{w,Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_w$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Analytical Temperature Rising Elution Fractionation (ATREF)

High Density Fraction (percent) is measured via analytical temperature rising elution fractionation analysis (ATREF). ATREF analysis is conducted according to the method described in U.S. Pat. No. 4,798,081 and Wilde, L.; Ryle, T. R.; Knobeloch, D. C.; Peat, I. R.; Determination of Branching Distributions in Polyethylene and Ethylene Copolymers, Journal of Polymer Science, 20, 441-455 (1982). The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min Viscosity average molecular weight (Mv) of the eluting polymer is measured and reported. An ATREF plot has the short chain branching distribution (SCBD) plot and a molecular weight plot. The SCBD plot has 3 peaks, one for the high crystalline fraction (typically above 90° C.), one for copolymer fraction (typically in between 30-90° C.) and one for purge fraction (typically below 30° C.). The curve also has a valley in between the copolymer and the high crystalline fraction. Thc is the lowest temperature in this valley. % High density (HD) fraction is the area under the curve above Thc. Mv is the viscosity average molecular weight from ATREF. Mhc is the average Mv for fraction above Thc. Mc is the average Mv of copolymer between 60-90° C. Mp is the average Mv of whole polymer.

Fast Temperature Rising Elution Fractionation (F-TREF)

The fast-TREF can be performed with a Crystex instrument by Polymer ChAR (Valencia, Spain) in orthodichlorobenzene (ODCB) with IR-4 infrared detector in compositional mode (Polymer ChAR, Spain) and light scattering (LS) detector (Precision Detector Inc., Amherst, Mass.).

When testing F-TREF, 120 mg of the sample is added into a Crystex reactor vessel with 40 ml of ODCB held at 160° C. for 60 minutes with mechanical stirring to achieve sample dissolution. The sample is loaded onto TREF column. The sample solution is then cooled down in two stages: (1) from 160° C. to 100° C. at 40° C./minute, and (2) the polymer crystallization process started from 100° C. to 30° C. at 0.4° C./minute. Next, the sample solution is held isothermally at 30° C. for 30 minutes. The temperature-rising elution process starts from 30° C. to 160° C. at 1.5° C./minute with flow rate of 0.6 ml/minute. The sample loading volume is 0.8 ml. Sample molecular weight ($M_w$) is calculated as the ratio of the 15° or 90° LS signal over the signal from measuring sensor of IR-4 detector. The LS-MW calibration constant is obtained by using polyethylene national bureau of standards SRM 1484a. The elution temperature is reported as the actual oven temperature. The tubing delay volume between the TREF and detector is accounted for in the reported TREF elution temperature.

Preparative Temperature Rising Elution Fractionation (P-TREF)

The temperature rising elution fractionation method (TREF) can be used to preparatively fractionate the polymers (P-TREF) and is derived from Wilde, L.; Ryle, T. R.; Knobeloch, D. C.; Peat, I. R.; "Determination of Branching Distributions in Polyethylene and Ethylene Copolymers", *J. Polym. Sci.*, 20, 441-455 (1982), including column dimensions, solvent, flow and temperature program. An infrared (IR) absorbance detector is used to monitor the elution of the polymer from the column Separate temperature programmed liquid baths—one for column loading and one for column elution—are also used.

Samples are prepared by dissolution in trichlorobenzene (TCB) containing approximately 0.5% 2,6-di-tert-butyl-4-methylphenol at 160° C. with a magnetic stir bar providing agitation. Sample load is approximately 150 mg per column. After loading at 125° C., the column and sample are cooled to 25° C. over approximately 72 hours. The cooled sample and column are then transferred to the second temperature programmable bath and equilibrated at 25° C. with a 4 ml/minute constant flow of TCB. A linear temperature program is initiated to raise the temperature approximately 0.33° C./minute, achieving a maximum temperature of 102° C. in approximately 4 hours.

Fractions are collected manually by placing a collection bottle at the outlet of the IR detector. Based upon earlier ATREF analysis, the first fraction is collected from 56 to 60° C. Subsequent small fractions, called subfractions, are collected every 4° C. up to 92° C., and then every 2° C. up to 102° C. Subfractions are referred to by the midpoint elution temperature at which the subfraction is collected.

Subfractions are often aggregated into larger fractions by ranges of midpoint temperature to perform testing. Fractions may be further combined into larger fractions for testing purposes.

A weight-average elution temperature is determined for each Fraction based upon the average of the elution temperature range for each subfraction and the weight of the subfraction versus the total weight of the sample. Weight average temperature is defined as:

$$T_w = \sum_T T(f) * A(f) \Big/ \sum_T A(f),$$

where T(f) is the mid-point temperature of a narrow slice or segment and A(f) is the area of the segment, proportional to the amount of polymer, in the segment.

Data are stored digitally and processed using an EXCEL (Microsoft Corp.; Redmond, Wash.) spreadsheet. The TREF plot, peak maximum temperatures, fraction weight percentages, and fraction weight average temperatures were calculated with the spreadsheet program.

Haze is determined according to ASTM-D 1003.

Gloss 45° is determined according to ASTM-2457.

Elmendorf Tear Resistance is measured according to ASTM-D 1922.

Dart Impact Strength is measured according to ASTM-D 1709-04, Method A.

C13 NMR Comonomer Content

It is well known to use NMR spectroscopic methods for determining polymer composition. ASTM D 5017-96, J. C. Randall et al., in "NMR and Macromolecules" ACS Symposium series 247, J. C. Randall, Ed., Am. Chem. Soc., Washington, D.C., 1984, Ch. 9, and J. C. Randall in "Polymer Sequence Determination", Academic Press, New York (1977) provide general methods of polymer analysis by NMR spectroscopy.

Gel Content Measurement

When the ethylene interpolymer, either alone or contained in a composition is at least partially crosslinked, the degree of crosslinking may be measured by dissolving the composition in a solvent for specified duration, and calculating the percent gel or unextractable component. The percent gel normally increases with increasing crosslinking levels. For cured articles according to the invention, the percent gel content is desirably in the range from at least about 5 to 100 percent as measured according to ASTM D-2765.

EXAMPLES

Preparation of Ethylene-Based Polymers

Multi-Constituent Catalyst

An exemplary multi-constituent catalyst system includes a Ziegler-Natta catalyst composition including a magnesium and titanium containing procatalyst and a cocatalyst. The procatalyst is a titanium supported $MgCl_2$ Ziegler Natta catalyst characterized by a Mg:Ti molar ratio of 40:1.0. The cocatalyst is a triethylaluminum. The procatalyst may have a Ti:Mg ratio between 1.0:40 to 5.0:40, preferably 3.0:40. The procatalyst and the cocatalyst components can be contacted either before entering the reactor or in the reactor. The procatalyst may, for example, be any other titanium based Ziegler Natta catalyst. The Al:Ti molar ratio of cocatalyst component to procatalyst component can be from about 1:1 to about 5:1.

General Description of the Multi-Constituent Catalyst System

The multi-constituent catalyst system, as used herein, refers to a Ziegler-Natta catalyst composition including a magnesium and titanium containing procatalyst and a cocatalyst. The procatalyst may, for example, comprise the reaction product of magnesium dichloride, an alkylaluminum dihalide, and a titanium alkoxide.

The olefin polymerization procatalyst precursors comprise the product which results from combining.

(A) a magnesium halide prepared by contacting:

(1) at least one hydrocarbon soluble magnesium component represented by the general formula R"R'Mg.xAlR'3 wherein each R" and R' are alkyl groups (2) at least one non-metallic or metallic halide source under conditions such that the reaction temperature does not exceed about 60° C., preferably does not exceed about 40° C., and most preferably does not exceed about 35° C.;

(B) at least one transition metal compound represented by the formula Tm(OR)y Xy-x wherein Tm is a metal of Groups IVB, VB, VIB, VIIB or VIII of the Periodic Table; R is a hydrocarbyl group having from 1 to about 20, preferably from 1 to about 10 carbon atoms.

(C) an additional halide source if an insufficient quantity of component (A-2) is present to provide the desired excess X:Mg ratio;

Particularly suitable transition metal compounds include, for example, titanium tetrachloride, titanium trichloride, vanadium tetrachloride, zirconium tetrachloride, tetra(isopropoxy)-titanium, tetrabutoxytitanium, diethoxytitanium dibromide, dibutoxytitanium dichloride, tetraphenoxytitanium, tri-isopropoxy vanadium oxide, zirconium tetra-n-propoxide, mixtures thereof and the like.

Other suitable titanium compounds which can be employed as the transition metal component herein include those titanium complexes and/or compounds resulting from reacting:

(A) at least one titanium compound represented by the formula Ti(OR)x X4-x wherein each R is independently a hydrocarbyl group having from 1 to about 20, preferably from about 1 to about 10, most preferably from about 2 to about 4 carbon atoms; X is a halogen and x has a value from zero to 4; with (B) at least one compound containing at least one aromatic hydroxyl group.

The foregoing procatalyst components are combined in proportions sufficient to provide atomic ratios as previously mentioned.

The foregoing pro-catalytic reaction product is preferably prepared in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° C. to about 200° C. Mixing of the procatalyst components to provide the desired catalytic reaction product is advantageously prepared under an inert atmosphere such as nitrogen, argon or other inert gas at temperatures in the range from about −100° C. to about 200° C., preferably from about −20° C. to about 100° C., provided that the magnesium halide support is prepared such that the reaction temperature does not exceed about 60° C. In the preparation of the catalytic reaction product, it is not necessary to separate hydrocarbon soluble components from hydrocarbon insoluble components of the reaction product.

The procatalyst composition serves as one component of a Ziegler-Natta catalyst composition, in combination with a cocatalyst. The cocatalyst is preferably employed in a molar ratio based on titanium in the procatalyst of from 1:1 to 100:1, but more preferably in a molar ratio of from 1:1 to 5:1.

Inventive Example 1

Inventive Example 1 is made according to the following procedures: A heterogeneously branched ethylene/α-olefin copolymer is prepared using a multi-constituent catalyst system, as described hereinabove, suitable for (co)polymerizing ethylene and one or more α-olefin comonomers, e.g. 1-octene, in two adiabatic spherical reactors, linked together in series, operating under a solution condition. The ethylene monomer, 1-octene comonomer, and hydrogen were combined with a solvent, e.g. Isopar® E, commercially available from ExxonMobil. The feed streams are purified from polar impurities such as water, carbon monoxide, sulfurous compounds, and unsaturated compounds such as acetylene and cooled to 13° C. before entering the reactor. The majority (85-90%) of the reaction occurs in the first sphere reactor that is 10-foot diameter. The mixing is achieved via circulating the polymer/catalyst/cocatalyst/solvent/ethylene/co-monomer/hydrogen solution with agitator equipped with mixing blades. The feed (ethylene/comonomer/solvent/hydrogen) enters the reactor from the bottom and the catalyst/cocatalyst enters the reactor separately from the feed and also from the bottom. The first reactor temperature is about 175° C., and the reactor pressure is about 500 psi. The temperature of the second reactor, in series with the first, increases to 202° C. with approximately 10-15% of the remaining reaction occurring and no additional streams added. Catalyst/Co-catalyst Al/Ti molar feed ratio is set at 1.5. The average reactor residence time is about 8 minutes per sphere reactor prior to termination post-reactor by a fluid specially designed for that purpose. After the polymer solution leaves the reactor, the solvent with unconverted ethylene monomer and 1-octene comonomer is removed from the polymer solution via a two stage devolatilizer system, and then recycled. The recycled stream is purified before entering the reactor again. The polymer melt is pumped through a die specially designed for underwater pelletization. The pellets are transferred to classifier screens to remove over and undersize particles. The finished pellets are then transferred to rail cars. The properties of the heterogeneously branched ethylene/α-olefin copolymer are listed in Table 1. FIG. 1 is an ATREF of Inventive Example 1.

The heterogeneously branched ethylene/α-olefin copolymer is further processed via blown film extrusion process on Gloucester line with a 6-inch diameter Sano die. The die has a gap of 70 mils. The film is blown with a blow up ratio of about 2.5 and a frost-line height of about 30 inches. The layflat width of the film is about 23.5 inches, while the thickness of the films is about 2 mils. The heterogeneously branched ethylene/α-olefin copolymer is melt extruded through an annular circular die. The hot melt emerges from the die thereby forming a tube. The tube is expanded by air, and at the same time, the cooled air chills the web to a solid state. The film tube is then collapsed within a V-shaped frame of rollers and is nipped at the end of the frame to trap the air within the bubble. The nip rolls also draw the film away from the die. The tube is slit and wound as a single-film layer onto a roll. The properties of the inventive film 1 are listed in Table 2.

Comparative Example 1

Comparative Example 1, a linear low density polyethylene, is made at 190 C reactor temperature and 3.5:1 Al/Ti ratio. All other conditions remain the same as the Inventive Example 1. The properties of Comparative Example 1 are listed in Table 1. FIG. 1 is an ATREF of Comparative Example 1. The Comparative Example 1 is processed via blown film extrusion process, as described above. The Comparative Example 1 is melt extruded through an annular circular die. The hot melt emerges from the die thereby forming a tube. The tube is expanded by air, and at the same time, the cooled air chills the web to a solid state. The film tube is then collapsed within a V-shaped frame of rollers and is nipped at the end of the frame to trap the air within the bubble. The nip rolls also draw the film away from the die. The tube is slit and wound as a single-film layer onto a roll. The properties of the comparative film 1 are listed in Table 2.

TABLE 1

Resin production and characterization data for inventive and comparative example 1.

| Description | Inventive Example 1 | Comparative Example 1 |
|---|---|---|
| Resin MI (g/10 minutes) | 0.80 | 0.80 |
| Resin density (g/cc) | 0.917 | 0.917 |
| Catalyst | HEC-3 | HEC-3 |
| Ti/40Mg | 3 | 3 |
| Al/Ti | 1.5 | 3.5 |
| Rx. Temp (° C.) | 175 | 190 |
| $M_{hc}$ | 103000 | 143000 |
| $M_c$ | 64234 | 54815 |
| $M_p$ | 76542 | 71007 |
| $M_{hc}/M_p$ | 1.35 | 2.01 |
| $M_c/M_p$ | 0.84 | 0.77 |
| % HD fraction - ATREF | 10.6 | 15.4 |

$T_{hc}$, lowest temperature in the valley between copolymer and high crystalline fraction
$M_v$, viscosity average molecular weight from ATREF
$M_{hc}$, Average Mv for fraction above $T_{hc}$ from ATREF
$M_c$, Avg Mv of copolymer between 60-90° C. - ATREF
$M_p$, Average Mv of whole polymer from ATREF
% HD fraction, area under the curve above $T_{hc}$

TABLE 2

Properties of films made from Inventive example 1 and Comparative example 1.

| Description | | Inventive Example 1 | Comparative Example 1 |
|---|---|---|---|
| Target thickness | mil | 2 | 2 |
| Dart A | g | 724 | 533 |
| Gloss 45° | | 91 | 70 |
| Haze | % | 5.6 | 10.6 |
| Normalized MD Tear | g/mil | 477 | 469 |

While the embodiments have been described with particularity, it will be understood that various other modifications will be apparent to and can be readily made by those skilled in the art without departing from the spirit and scope of the invention. Accordingly, it is not intended that the scope of the claims to be limited to the examples and descriptions set forth but rather that the claims be construed as encompassing all the features of patentable novelty which reside in the present invention, including all features which would be treated as equivalents by those skilled in the art to which the invention pertains.

It is intended that the disclosure of preferred or desired, more preferred or more desired, highly preferred or highly desired, or most preferred or most desired substituents, ranges, end uses, processes, or combinations with respect to any one of the disclosed compositions and methods is applicable as well to any other of the preceding or succeeding embodiments of the disclosed compositions and methods, independently of the identity of any other specific substituent, range, use, process, or combination.

Unless otherwise stated, implicit from the context or conventional in the art, all parts and percentages are based on weight.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

Depending upon the context in which such values are described, and unless specifically stated otherwise, such values may vary by 1 percent, 2 percent, 5 percent, or, sometimes, 10 to 20 percent. Whenever a numerical range with a lower limit, RL, and an upper limit, RU, is disclosed, any number falling within the range, including the limits themselves is specifically disclosed. In particular, the following numbers within the range are specifically disclosed: R=RL+ k*(RU−RL), wherein k is a variable ranging from 0.01 to 1.00 with a 0.01 increment, that is, k is 0.01 or 0.02 to 0.99 or 1.00. Moreover, any numerical range defined by two R numbers as defined is also specifically disclosed.

We claim:

1. An interpolymer of ethylene and at least one alpha-olefin prepared in a single reactor in the presence of a multi-constituent catalyst system, wherein the interpolymer is heterogeneously branched polymer produced in the single reactor and wherein the interpolymer displays only two peaks and one valley from 30° C. to 120° C. in ATREF and has an average $M_v$ and a valley temperature between the interpolymer and high crystalline fraction, $T_{hc}$, such that the average $M_v$ for a fraction above $T_{hc}$ from ATREF divided by average $M_v$ of the whole polymer from ATREF ($M_{hc}/M_p$) is less than 1.7 and wherein the interpolymer has a CDBI of less than 48%.

2. The interpolymer of claim 1 wherein said interpolymer has a CDBI of less than 45%.

3. Film comprising the interpolymer of claim 1.

4. The film of claim 3 comprising a Dart A of at least 550 gm.

5. The film of claim 3 comprising haze of <10%.

6. The film of claim 3 comprising 45 degree gloss >75 units.

7. The film of claim 3 comprising Normalized MD Tear >400 gm/mil.

8. The interpolymer of claim 1 further comprising at least one other natural or synthetic polymer.

9. The interpolymer of claim 8 where the synthetic polymer is low density polyethylene.

10. The interpolymer of claim 1 comprising a melt index from about 0.1 to about 10 g/10 min.

11. The interpolymer of claim 1 comprising an overall density from about 0.9 to about 0.935 g/cm$^3$.

12. The interpolymer of claim 1 comprising long chain branches less than 1 per 1000 C atoms.

13. The interpolymer of claim 1 comprising a molecular weight distribution, $M_w/M_n$, of less than about 5.

14. A fabricated article comprising the interpolymer of claim 1.

15. The interpolymer of claim 1, wherein the interpolymer has been at least partially cross-linked to at least 5%, by weight, gel.

16. A process to make the interpolymer of claim 1, comprising the steps of contacting ethylene with at least one alpha-olefin under polymerization conditions of temperature and pressure with a catalyst composition to form an ethylene/alpha-olefin interpolymer, wherein the polymerization conditions comprise a catalyst metal and aluminum, and wherein the molar ratio of aluminum to catalyst metal atom is from about 1:1 to about 5:1, the process further comprising recovering the ethylene/alpha-olefin interpolymer.

* * * * *